United States Patent [19]

Coran et al.

[11] Patent Number: 4,473,683

[45] Date of Patent: Sep. 25, 1984

[54] ACRYLIC COPOLYMER RUBBER/STYRENIC AMORPHOUS RESIN BLENDS

[75] Inventors: Aubert Y. Coran; Raman Patel, both of Akron, Ohio

[73] Assignee: Monsanto Company, St. Louis, Mo.

[21] Appl. No.: 446,813

[22] Filed: Dec. 3, 1982

[51] Int. Cl.³ .................... C08L 23/26; C08L 25/04; C08L 55/02
[52] U.S. Cl. .................................. 525/78; 525/196; 525/221
[58] Field of Search .................... 525/78, 196, 221

[56] References Cited

U.S. PATENT DOCUMENTS

| 3,249,570 | 5/1966 | Potts et al. | 525/221 |
| 3,437,718 | 4/1969 | Rees | 525/221 |
| 3,454,676 | 7/1969 | Busse | 525/221 |
| 4,165,347 | 8/1979 | Bauer et al. | 525/196 |
| 4,226,953 | 10/1980 | Coran et al. | 525/193 |
| 4,310,638 | 1/1982 | Coran et al. | 525/183 |
| 4,327,199 | 4/1982 | Coran et al. | 525/176 |

Primary Examiner—Carman J. Seccuro
Attorney, Agent, or Firm—Larry R. Swaney

[57] ABSTRACT

Improved thermoplastic compositions comprising blends of neutralized acrylic copolymer rubber and styrenic amorphous resin are described.

10 Claims, No Drawings

ACRYLIC COPOLYMER RUBBER/STYRENIC AMORPHOUS RESIN BLENDS

This application relates to neutralized acid containing acrylic copolymer rubber compositions containing styrenic amorphous resin intimately blended therewith.

BACKGROUND OF THE INVENTION

Metal-ion neutralized, acid-containing acrylic copolymer rubbers are thermoplastic elastomeric materials useful for molded parts, but their usefulness is somewhat restricted due to their limited fabricability, especially at moderate processing temperatures.

SUMMARY OF THE INVENTION

It has now been discovered that improved thermoplastic compositions comprising at least partially neutralized, acid-containing acrylic copolymer rubber are obtained by blending styrenic amorphous resin (SAR) therewith. The improved compositions are stronger and exhibit better fabricability than compositions containing no SAR. Thus, parts can be fabricated from the compositions at temperatures below those required for the neutralized rubber alone. Also, compositions containing major proportions of SAR exhibit greater toughness and impact resistance than SAR without the rubber.

Improved properties are obtained with compositions comprising about 5 to 80 parts by weight of neutralized acid-containing acrylic copolymer rubber and about 95 to about 20 parts by weight of SAR per 100 parts by weight of said rubber and SAR combined. When the amount of SAR is not more than 40 weight percent of the composition, thermoplastic elastomeric (elastoplastic) compositions are obtained.

Thus, an elastoplastic composition of the invention comprises a blend of SAR in an amount up to 40 weight percent of the composition, and neutralized, acid-containing acrylic copolymer rubber, in an amount sufficient to impart rubberlike elasticity up to 80 weight percent of the composition, which composition is processable as a thermoplastic and is elastomeric. The composition can contain plasticizer. For the elastomeric compositions of the invention, however, if the composition contains more SAR than rubber, sufficient plasticizer must be present to impart rubberlike elasticity to the composition. Compositions frequently contain plasticizer in amounts not exceeding the weight of the SAR.

Preferred elastoplastic compositions of the invention comprise about 80 to 50 parts by weight of neutralized, acid-containing acrylic copolymer rubber and about 20 to 50 parts by weight of SAR per 100 parts by weight of said rubber and SAR combined. More preferred compositions exhibiting high strength, high elongation, and low Young's modulus comprise metal ion neutralized acid containing acrylic copolymer rubber and about 20 to 40 parts by weight of SAR per 100 parts by weight of said rubber and SAR combined.

The compositions may be prepared by melt mixing neutralized acid-containing acrylic copolymer rubber and SAR in the indicated proportions, preferably by mastication, above the softening temperature of the SAR. A more preferred procedure comprises melt mixing the acid-containing acrylic copolymer rubber and SAR until a homogeneous composition is obtained, then an acid-polymer neutralizing agent, for example, a source of metal ion is added and mixing is continued until neutralization of the acid groups occurs. Mono-, di- and trivalent metal ions are suitable for the practice of the invention. Metal compounds suitable for a source of metal ions include oxides, hydroxides and metal salts, for example, formates, acetates, carbonates and bicarbonates. Metal oxides, especially magnesium oxide, zinc oxide or calcium oxide are preferred.

The acid containing acrylic copolymer rubber should be at least 10 percent up to 100 percent neutralized by metal ions. Preferably, the rubber is about 20 to 90 percent neutralized. More preferably, enough neutralizing agent is used to neutralize at least 50 percent of the acid when the carboxylated rubber contains less than 2 mole percent of carboxyl group. Lesser percentages of carboxylic acid group neutralization are preferred for more highly carboxylated rubbers. Depending upon the source of metal ion, typically about 0.5 to 5 parts by weight of metal compound per 100 parts by weight of rubber is adequate. Preferred metal ions include those of alkali metals and alkaline earths.

Suitable acid-containing acrylic copolymer rubbers comprise rubbery interpolymers of ethylenically unsaturated carboxylic acid, acrylic ester, and olefin. The rubber of the invention must be based on a polymerization mixture containing at least about 25 mole percent of a mixture of acrylic or methacrylic acid and acrylic ester. They are distinguished from polyacrylate rubbers which generally are essentially acrylic ester polymers. Suitable rubbers include acrylic acid-acrylic ester-alpha-olefin terpolymers which are essentially non-crystalline and have glass transition temperatures (Tg) below room temperature. Suitable rubbers are preferably prepared by the polymerization of a mixture of alkyl acrylate, acrylic acid or methacrylic acid and an alpha olefin of 2-8 carbon atoms. A typical acrylic copolymer rubber is a polymer of ethylene, $C_1$-$C_4$ alkyl acrylate and acrylic acid. A more preferred acrylic acid rubber is a polymer comprising at least 50 mole percent of ethylene, about 0.5 to 10 mole percent of acrylic acid and about 15 to 49.5 mole percent of alkyl acrylate.

Suitable styrene amorphous resins (SARs) include random non-crystalline thermoplastic high molecular weight solid products from the polymerization of styrene or mixtures of monomers comprising styrene and acrylonitrile. The styrene amorphous resins of the invention are random polymers and should not be confused with styrene block copolymers. Examples of satisfactory styrene amorphous resins are polystyrene (PS) resin, high impact polystyrene (HIPS) from styrene and polybutadiene, styrene-acrylonitrile (SAN) resin, and acrylonitrile-butadiene-styrene (ABS) resin all of which are items of commerce readily prepared by known processes. For example, SAN may be prepared by emulsion polymerization as described in U.S. Pat. No. 2,140,048. The proportion of styrene monomer may vary from 30-85 weight percent, and, correspondingly, the proportions of acrylonitrile monomer may vary from 70-15 weight percent, however, resins containing 50 weight percent or more styrene monomer are preferred. SAN resins containing 20-40 weight percent acrylonitrile monomer are especially preferred.

Satisfactory ABS resins are acrylonitrile-polybutadiene-styrene copolymers prepared by blending styrene-acrylonitrile copolymer (SAN resins as described above) with polybutadiene rubber or by polymerizing styrene and acrylonitrile in the presence of polybutadiene rubber latex which sometimes results in the grafting of some of the SAN copolymer onto the rubber. Suitable proportions of styrene and acrylonitrile in ABS resins are the same as neat SAN resin which ABS resins may contain up to 30 wt. percent polybutadiene. Two commercial grades of ABS resin contain about 13% and 26% polybutadiene.

The properties of the compositions of the invention may be modified by the addition of ingredients which are conventional in the compounding of acrylic rubber or SAR. Examples of such ingredients include carbon black, silica, titanium dioxide, clay, coupling agents such as silanes or titanates, stabilizers, antidegradants, plasticizers, extender oils, processing aids, adhesives, tackifiers, waxes, and discontinuous fibers such as wood cellulose or glass fibers, etc. The incorporation of particulate filler into the rubber, preferably prior to melt mixing or neutralization of the acid groups is particularly recommended. The particulate filler is generally masterbatched with the rubber which is then mixed with the SAR. Typical additions of particulate fillers or reinforcement fillers such as silica or carbon black comprise about 10-80 parts by weight of filler per 100 parts by weight of rubber. The amount of particulate filler which can be used depends, at least in part, upon the type of filler and the presence of other ingredients such as plasticizer.

Thermoplastic compositions of the invention are useful for making a variety of articles such as hoses, belts, gaskets, moldings and molded parts. They are particularly useful for making articles by extrusion, injection molding and compression molding techniques. Compositions of the invention containing high proportions of rubber are especially useful for blending with resins to improve their impact resistance. Examples of such resins are polystyrene, SAN resin, ABS resin and nylon.

Tensile properties of the compositions are determined by ASTM procedures D-1708-66 and D-638. Specimens are pulled with a tensile tester at 2.54 cm. per minute up to 30 percent elongation and 25.4 cm. per minute to failure (unless specified otherwise).

The term "elastomeric" as used herein and in the claims refers to rubberlike elasticity of a composition which possesses the property of forcibly retracting within ten minutes to less than 150% of its original length after being stretched at room temperature to twice its unstressed length and held for ten minutes before release (e.g. tension set is 50% or less). True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubber compositions having tension set values of about 50% or less.

A more preferred composition additionally has a Shore D hardness of 45 or below or a Young's modulus E below about 150 MPa.

DESCRIPTION OF THE PREFERRED EMBODIMENTS

Compositions illustrating the invention are prepared by charging SAR, acid containing acrylic copolymer rubber, and magnesium oxide in the indicated amounts (all parts by weight), into a Haake Rheocord mixer. The mixing speed is varied to maintain the stock temperature between 180°-200° C. After the SAR is melted, the components are mixed for ten minutes during which the mixing torque increases.

Materials used to illustrate the invention are as follows: Acid containing acrylic copolymer rubber sold under the tradename of Vamac believed to be a terpolymer of about 73 mole percent of ethylene, about 26 mole percent methyl acrylate and about one mole percent of acrylic acid, ABS resin sold under the tradename LUSTRAN 246 believed to be an acrylonitrile/styrene copolymer containing about 13% polybutadiene, and magnesium oxide sold under the tradename Maglite D.

The effect of SAR/rubber proportions is shown in Table 1. The magnesium oxide level is held constant at 3 parts by weight per 100 parts by weight of rubber. The rubber is Vamac N-123 supplied in the form of a masterbatch of 100 parts if rubber and 23 parts of fumed silica, stabilizers and processing aids. For convenience, the amount of rubber, silica (plus rubber stabilizers and processing aids), and ABS resin are shown separately in the tables. Test specimens are prepared by compression molding at about 230° C. Properties of the molded sheet are then measured and recorded. The data show that incorporating ABS resin into the neutralized rubber results in improved properties including high tensile strength and fabricability.

Compositions of the invention containing polystyrene (PS) resin, styrene acrylonitrile (SAN) resin and an ABS resin containing about 26% polybutadiene are shown in Table 2. The preparation procedure and components of the compositions are the same as in Table 1 except for the resins.

TABLE 1

|  | 1 | 2 | 3 | 4 | 5 | 6 | 7 | 8 | 9 | 10 |
|---|---|---|---|---|---|---|---|---|---|---|
| Acidic Acrylic Rubber | 100 | 90 | 80 | 70 | 60 | 50 | 40 | 30 | 20 | 10 |
| ABS Resin | 0 | 10 | 20 | 30 | 40 | 50 | 60 | 70 | 80 | 90 |
| Silica, Rubber Stabilizers & Processing Aids | 23 | 20.7 | 18.4 | 16.1 | 13.8 | 11.5 | 9.2 | 6.9 | 4.6 | 2.3 |
| MgO | 3.0 | 2.7 | 2.4 | 2.1 | 1.8 | 1.5 | 1.2 | 0.9 | 0.6 | 0.3 |
| Properties |  |  |  |  |  |  |  |  |  |  |
| TS, MPa | 16.3 | 18.7 | 18.3 | 17.7 | 20.5 | 22.1 | 23.1 | 26.0 | 29.9 | 34.8 |
| $M_{100}$, MPa | 3.9 | 4.8 | 8.3 | 11.3 | 16.2 | 19.6 | 22.5 | 26.0 | — | — |
| E, MPa | 3.7 | 5.2 | 13 | 35 | 111 | 263 | 459 | 637 | 864 | 979 |
| Ult. Elong., % | 470 | 590 | 450 | 350 | 250 | 210 | 140 | 110 | 80 | 71 |
| Ten. Set, % | 7 | 11 | 20 | 39 | 60 | 74 | 81 | — | — | — |
| TSB, MPa | 93 | 129 | 101 | 80 | 71 | 69 | 56 | 54 | 54 | 50 |
| Shore D Hardness | 22 | 25 | 30 | 34 | 45 | 56 | 60 | 65 | 68 | 74 |

TABLE 2

|  | 1 | 2 | 3 |
|---|---|---|---|
| Acidic Acrylic Rubber | 60 | 60 | 60 |
| PS Resin | 40 | — | — |
| SAN Resin | — | 40 | — |
| ABS Resin | — | — | 40 |
| Silica, Rubber Stabilizers & Processing Aids | 13.8 | 13.8 | 13.8 |
| MgO | 1.8 | 1.8 | 1.8 |
| Properties |  |  |  |

TABLE 2-continued

|  | 1 | 2 | 3 |
|---|---|---|---|
| TS, MPa | 13.8 | 15.7 | 23.6 |
| $M_{100}$, MPa | 12.6 | 15.5 | 15.5 |
| E, MPa | 160 | 140 | 51 |
| Ult. Elong., % | 320 | 150 | 270 |
| Ten. Set, % | 66 | 75 | 38 |
| TSB, MPa | 58 | 39 | 86 |

TABLE 3

|  | 1 | 2 | 3 | 4 | 5 | 6 | 7 |
|---|---|---|---|---|---|---|---|
| Acidic Acrylic Rubber | 100 | 90 | 85 | 75 | 70 | 60 | 50 |
| ABS Resin | 0 | 10 | 15 | 25 | 30 | 40 | 50 |
| Silica, Rubber Stabilizers & Processing Aids | 23 | 20.7 | 19.6 | 17.3 | 16.1 | 13.8 | 11.5 |
| MgO | 3.0 | 2.7 | 2.55 | 2.25 | 2.1 | 1.8 | 1.5 |
| Properties |  |  |  |  |  |  |  |
| TS, MPa | 22.2 | 22.3 | 19.5 | 19.3 | 20.9 | 21.7 | 21.3 |
| $M_{100}$, MPa | 5.0 | 8.0 | 9.6 | 11.1 | 13.8 | 17.4 | 20.2 |
| E, MPa | 4.2 | 6.1 | 7.0 | 17.6 | 33.6 | 78.9 | 213 |
| Ult. Elong., % | 480 | 370 | 390 | 310 | 270 | 220 | 150 |
| Ten. Set, % | 4 | 5 | 9 | 20 | 25 | 45 | 65 |
| TSB, MPa | 128 | 106 | 96 | 79 | 76 | 69 | 52 |
| Shore D Hardness | 25 | 27 | 29 | 34 | 37 | 46 | 55 |
| Apparent Melt Viscosity, KPa | 0.37 | 0.35 | 0.34 | 0.24 | 0.21 | 0.17 | 0.13 |

The resin of stock 1 is polystyrene homopolymer sold under the tradename Lustrex HH101. The resin of stock 2 is SAN resin sold under the tradename Lustran DN77. The resin of stock 3 is ABS resin sold under the tradename Lustran 780. The proportions (parts by weight) of components are indicated in the table. The data show that tensile strength and true stress at break, TSB, are improved. Comparison of stock 3 with stock 5 of Table 1 indicates that ABS resin containing a higher proportion of polybutadiene gives a blend exhibiting improved tensile properties including better tension set.

The effect of blend proportions on melt viscosity is shown in Table 3. The preparation procedure and components are the same as in Table 1. Test specimens are prepared by compression molding at about 250° C. Properties of the molded sheet are then measured and recorded. The apparent melt viscosity is determined by use of a Monsanto Processability Tester with a preheat time of 5 minutes and a barrel temperature of 250° C. The viscosity values recorded in Table 3 were determined at a shear rate of about 2300 reciprocal seconds. The tensile property data when compared with those of Table 1 of identical compositions indicate that molding temperature has an effect on properties. A plot of viscosity versus component proportions shows a sharp break at about 20 parts by weight of ABS resin. There is a significant decrease in viscosity above 20 parts by weight of ABS resin indicating better processability.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 5 to 80 parts by weight of at least 10% partially neutralized, acid-containing acrylic copolymer rubber which is a polymer of at least 50 mole percent of ethylene, about 0.5 to 10 mole percent of acrylic acid and about 15 to 49.5 mole percent of alkyl acrylate, and about 95 to 20 parts by weight of styrene amorphous resin (SAR) which is selected from the group consisting of polystyrene (PS) resin, styrene/acrylonitrile (SAN) resin and acrylonitrile/butadiene/styrene (ABS) resin containing up to 30 wt. percent polybutadiene per 100 parts by weight of said rubber and SAR combined.

2. The composition of claim 1 in which the acrylic copolymer rubber is at least 50 to 100 percent neutralized with metal ion.

3. The composition of claim 2 in which the SAR is ABS resin.

4. The composition of claim 2 comprising 80 to 50 parts by weight of metal ion neutralized, acid-containing acrylic copolymer rubber and 20 to 50 parts by weight of SAR per 100 parts by weight of said rubber and SAR combined.

5. The composition of claim 4 comprising metal ion neutralized, acid-containing acrylic copolymer rubber and about 20 to 40 parts by weight percent of SAR per 100 parts by weight of said rubber and SAR combined.

6. The composition of claim 5 in which the source of metal ion is a metal oxide.

7. The composition of claim 6 in which the rubber is neutralized with magnesium ion or calcium ion.

8. The composition of claim 7 comprising a copolymer rubber containing about 1 to 5 weight percent of acrylic acid and about 0.5 to 5 parts by weight of metal oxide per 100 parts by weight of rubber.

9. The composition of claim 8 in which the rubber is neutralized with magnesium ion.

10. The composition of claim 9 in which the SAR is ABS resin.

* * * * *